May 9, 1950  E. A. HOBART  2,506,787
ELECTRIC CONTROL SWITCH
Filed Dec. 27, 1946

INVENTOR
EDWARD A. HOBART
BY
Toulmin & Toulmin
ATTORNEYS

Patented May 9, 1950

2,506,787

UNITED STATES PATENT OFFICE 2,506,787

ELECTRIC CONTROL SWITCH

Edward A. Hobart, Troy, Ohio, assignor to The Hobart Brothers Company, Troy, Ohio, a corporation of Ohio Application December 27, 1946, Serial No. 718,815

3 Claims. (Cl. 290—11)

This invention relates to a switch arrangement, and particularly to a heavy duty switch arrangement especially adapted for use with an electrical generating apparatus adapted for use as both a welder and a power plant.

The particular object of this invention is to provide a switch mechanism especially adapted for controlling heavy currents and having long life.

Another object of this invention is to provide an improved control switch for a combined power supply and welding circuit which is easily operable between its several positions and which is capable of conducting heavy currents.

Further features and advantages of this invention will appear from the detailed description of the drawings in which.

Figure 1:
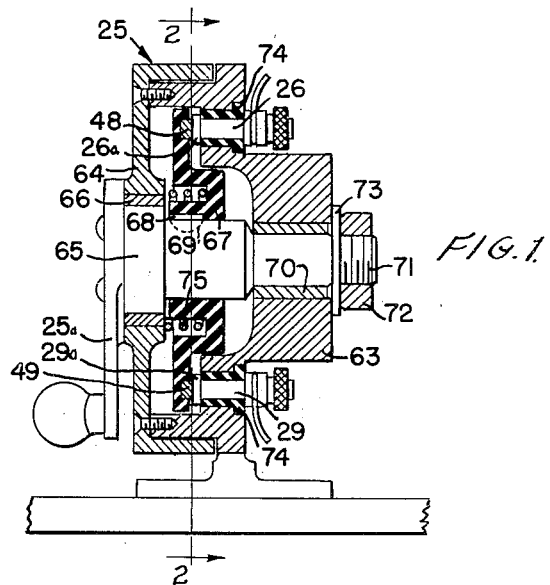
Figure 1 is a vertical section through the switch and is indicated by the line 1—1 on Figure 2.

The particular use contemplated for the switch of this invention is in connection with a combination welder and power plant which comprises an alternating current generator of the rotating field type and a suitable source of exciting current for the said field coils.

The generator also comprises stator coils adapted for series or parallel connection by the switch of this invention. When the stator coils are connected in parallel, they supply the heavy current required for welding operations and at the relatively low voltage usually associated with welding. When the generator is to be used for supplying power, as, for example, for motors or lighting circuits, the stator coils are connected in series by the switch and supply a lesser current, but at a higher voltage.

The generator and exciter may, of course, be provided with the usual controls for adjusting the current supply to the field coils of the generator, and so forth. Also, any suitable power means may be employed for driving the generator and exciter, and, in the case of a portable welder and power plant such as the switch of this invention was specifically designed for, the said power plant may advantageously comprise an internal combustion engine of any well known type.

Referring to the drawings, the switch of this invention, 25, may preferably be arranged as follows: a frame 63 covered by a frame cap 64; a control lever 25a attached to the stepped shaft 65 suitably journaled in the frame cap 64 on the bearing 66 and in the frame 63 on the bearing 70; a disc 67 composed of suitable insulating material provided with a key way 68 so that a driving connection may be maintained between the stepped shaft 65 and the disc 67 by means of a key 69 provided in the shaft 65; two contact bars 48 and 49 carried in the insulated disc 67, best shown in Figures 5 and 6; threads 71 on the shaft 65 on which a nut 72 is screwed; a washer 73 placed between the nut 72 and the frame 63 so that the nut may be adjusted to give proper end play for the shaft 65 in the frame 63 and cap 64; five terminal binding posts 26, 27, 28, 29, and 30 positioned in the frame 63, as best shown in Figures 5 and 6, and surrounded by insulated bushing 74; contact buttons 26a, 27a, 28a, 29a, and 30a provided for each of the respective terminal binding posts; and a compression spring 75 placed between the insulated disc 67 and the frame cap 64 so as to keep the bars 48 and 49 in proper contact with the contact buttons of the respective terminal binding posts.

Figure 2:
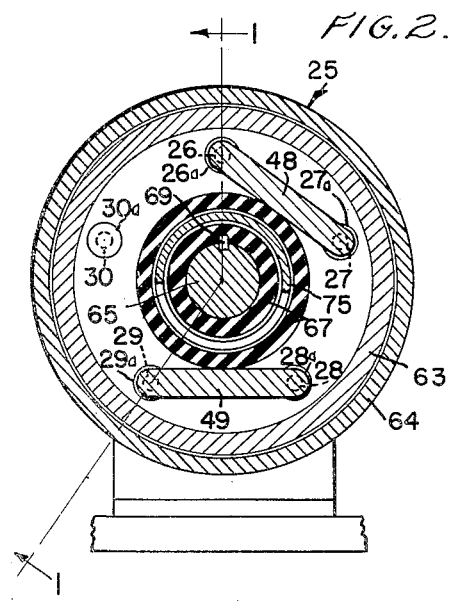
Figure 2 is a vertical section indicated by line 2—2 on Figure 1.
Figure 3:
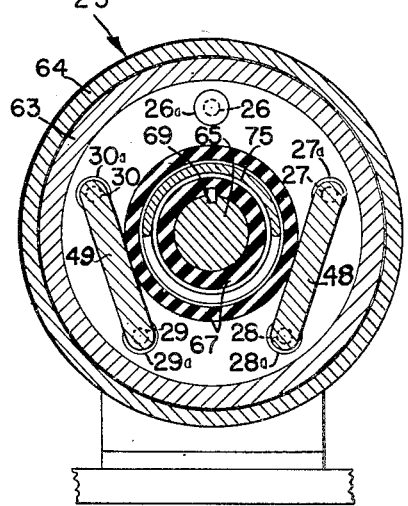
Figure 3 is a view similar to Figure 2 but showing the switch adjusted to a different operative position.

In operation, when the lever 25a is turned through one-fifth of a revolution, the shaft 65 and key 69 move the insulated disc 67 a similar distance. By such a movement, the bars 48 and 49 may be made to first interconnect the terminal 26 to terminal 27 and the terminal 28 to terminal 29, Figure 2, through their respective contact buttons (the arrangement for welding), and then to connect the terminal 27 to terminal 28 and the terminal 29 to terminal 30, Figure 3, (the arrangement for power supply). A good contact between the contact bars and the respective contact buttons is maintained by the pressure exerted on the disc 67 by the compression spring 75.

Thus, an alternating current revolving field type generator or the like, driven by a prime mover such as an internal combustion engine, may be regulated by the switch 25 for putting the stator windings of the generator in either series or parallel connection so as to provide high voltages for power supply or lower voltages for welding.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. In a multi-pole drum switch; a body having a shouldered cylindrical cavity therein, a plurality of contact members insulatingly carried by said body and circumferentially spaced around the shoulder of said cavity, a rotor in said cavity having a peripheral part in the larger part of said cavity overlying said contacts and having a hub part extending into the smaller part of said cavity, contact elements carried by the said peripheral part of said rotor for effecting connections between said contact members, a shaft traversing said body coaxially with said cavity and rotatable in said body but held therein against axial movement, said rotor being slidably keyed to said shaft, a recess in the hub part of said rotor on the side thereof opposite its engagement with said contact members, and a spring bearing between said body and the bottom of the recess in said rotor for urging it into engagement with said contact members.

2. In a multi-pole drum switch; a first body part having a shouldered recess therein, a plurality of contact members insulatingly carried by said body part and circumferentially spaced about the shoulder of said recess, a rotor having a peripheral part in the larger part of said recess and a reduced diameter hub part extending into the smaller part of said recess, a closure member forming a second body part and mounted on said first body part for closing the recess therein, a shaft extending through said body parts and rotor rotatable in said body parts but held therein against axial movement, said shaft being slidably keyed to said rotor, an annular cavity in the side of said rotor toward said second body part, and a compression spring bearing between said second body part and the bottom part of the said annular cavity in said rotor for urging the rotor into engagement with said contact members, said rotor carrying contact elements for effecting electrical connections between said contact members.

3. In a multi-pole drum switch; a first body part having a shouldered cylindrical recess extending therein from one side, a plurality of circumferentially spaced contact members insulatingly carried by said body part and positioned in the shoulder between the larger and smaller parts of said recess, a rotor of insulating material having a peripheral part in the larger part of said recess so as to overlie said contact members and a reduced diameter hub part projecting into the smaller part of said recess, contact elements carried by the peripheral part of said rotor on the side toward said contact members, a second body part mounted over the said one side of said first body part forming a closure for the said recess, a shaft traversing said body parts and rotor coaxial with said recess and rotatable in said body part but held therein against axial movement, means slidably keying said rotor to said shaft, an annular groove extending into the hub of said rotor from the side thereof toward said second body part, and a compression spring bearing between said second body part and the bottom of said groove.

EDWARD A. HOBART.

REFERENCES CITED

The following references are of record in the file of this patent:

UNITED STATES PATENTS

| Number | Name | Date |
|---|---|---|
| 261,265 | Seymour | July 18, 1882 |
| 1,221,200 | McClenathen | Apr. 3, 1917 |
| 1,629,397 | Lewis | May 17, 1927 |
| 1,696,744 | Wyman | Dec. 25, 1928 |
| 1,719,112 | Holslag | July 2, 1929 |
| 2,102,481 | Noel | Dec. 14, 1937 |

FOREIGN PATENTS

| Number | Country | Date |
|---|---|---|
| 413,248 | Germany | May 19, 1925 |